United States Patent
Stouffer et al.

(10) Patent No.: US 10,155,673 B2
(45) Date of Patent: Dec. 18, 2018

(54) REMOVAL OF CHLORAMINE AND MERCURY FROM AQUEOUS SOLUTIONS

(71) Applicant: 3M INNOVATIVE PROPERTIES COMPANY, St. Paul, MN (US)

(72) Inventors: Mark R. Stouffer, Middletown, CT (US); Meredith M. Doyle, Saint Paul, MN (US); Angela M. Moreno, Killingworth, CT (US); Allen R. Siedle, Bloomington, IN (US)

(73) Assignee: 3M Innovative Properties Company, St. Paul, MN (US)

( * ) Notice: Subject to any disclaimer, the term of this patent is extended or adjusted under 35 U.S.C. 154(b) by 73 days.

(21) Appl. No.: 14/773,449

(22) PCT Filed: Mar. 3, 2014

(86) PCT No.: PCT/US2014/019904
§ 371 (c)(1),
(2) Date: Sep. 8, 2015

(87) PCT Pub. No.: WO2014/164013
PCT Pub. Date: Oct. 9, 2014

(65) Prior Publication Data
US 2016/0016819 A1    Jan. 21, 2016

Related U.S. Application Data

(60) Provisional application No. 61/777,013, filed on Mar. 12, 2013.

(51) Int. Cl.
*C02F 1/28* (2006.01)
*B01J 20/20* (2006.01)
(Continued)

(52) U.S. Cl.
CPC .............. *C02F 1/283* (2013.01); *B01J 20/20* (2013.01); *B01J 20/28011* (2013.01);
(Continued)

(58) Field of Classification Search
CPC ...... C02F 1/283; C02F 1/288; C02F 2101/12; C02F 2101/20; C02F 2101/36
See application file for complete search history.

(56) References Cited

U.S. PATENT DOCUMENTS 4,094,777 A    6/1978  Sugier
4,500,327 A    2/1985  Nishino et al.
(Continued)

FOREIGN PATENT DOCUMENTS

CN    1288904    12/2006
CN    101428795    5/2009
(Continued)

OTHER PUBLICATIONS

Wang et al, Adsorption of Aqueous Hg(II) by Sulfur-Impregnated Activated Carbon, Oct. 2009, Environmental Engineering Science, vol. 26, No. 12, pp. 1693-1699.*
(Continued)

*Primary Examiner* — Matthew O Savage
(74) *Attorney, Agent, or Firm* — Julie Lapos-Kuchar

(57) ABSTRACT

Described herein is a method of removing mercury from an aqueous solution comprising: providing an aqueous solution comprising chloramine and mercury; and contacting the aqueous solution with a medium comprising a porous carbon substrate comprising at least 1.5% by mass of sulfur.

16 Claims, 2 Drawing Sheets

(51) Int. Cl.
    *B01J 20/30* (2006.01)
    *B01J 20/28* (2006.01)
    *C02F 101/12* (2006.01)
    *C02F 101/20* (2006.01)

(52) U.S. Cl.
    CPC .......... *B01J 20/3085* (2013.01); *C02F 1/288* (2013.01); *C02F 2101/12* (2013.01); *C02F 2101/20* (2013.01); *C02F 2303/185* (2013.01)

(56) References Cited

U.S. PATENT DOCUMENTS

| | | | |
|---|---|---|---|
| 4,624,937 | A | 11/1986 | Chou |
| 4,985,150 | A | 1/1991 | Cronje et al. |
| 5,338,458 | A | 8/1994 | Carrubba |
| 5,356,849 | A | 10/1994 | Matviya |
| 5,504,050 | A | 4/1996 | Hayden |
| 6,270,822 | B1 | 8/2001 | Frazier |
| 6,342,129 | B1 | 6/2002 | Vaughn et al. |
| 1,653,001 | A1 | 3/2004 | Baker |
| 6,699,393 | B2 | 3/2004 | Baker |
| 7,177,525 | B2 | 2/2007 | Moriyama |
| 7,361,280 | B2 | 4/2008 | Baker |
| 8,205,755 | B2 | 6/2012 | Stouffer |
| 8,206,627 | B2 | 6/2012 | Stouffer |
| 8,486,856 | B2 | 7/2013 | Henning et al. |
| 2002/0195396 | A1 | 12/2002 | Chane-Ching |
| 2003/0209498 | A1 | 11/2003 | Baker |
| 2004/0124152 | A1 | 7/2004 | Baker |
| 2009/0039028 | A1 | 2/2009 | Eaton |
| 2010/0078390 | A1 | 4/2010 | Cross |
| 2010/0113266 | A1 | 5/2010 | Abe et al. |
| 2010/0213104 | A1 | 8/2010 | Hughes |
| 2010/0239479 | A1 | 9/2010 | Gadkaree |
| 2010/0272621 | A1 | 10/2010 | Chang |
| 2011/0000855 | A1 | 1/2011 | Kuhel |
| 2011/0042298 | A1* | 2/2011 | Stouffer ............. B01D 39/2062 210/443 |
| 2011/0203993 | A1 | 8/2011 | Hughes |
| 2011/0244012 | A1 | 10/2011 | Hironori et al. |
| 2011/0296991 | A1 | 12/2011 | Hughes |
| 2012/0055862 | A1 | 3/2012 | Parekh |
| 2013/0023405 | A1 | 1/2013 | Hitomi |

FOREIGN PATENT DOCUMENTS

| | | |
|---|---|---|
| CN | 101428796 | 5/2009 |
| CN | 102432085 | 5/2012 |
| JP | 59-78915 | 5/1984 |
| JP | 02-071892 | 3/1990 |
| JP | 2002-95933 | 4/2002 |
| JP | 2003-266082 | 9/2003 |
| JP | 2010-505606 | 2/2010 |
| JP | 2011-225521 | 11/2011 |
| WO | WO 2008/146773 | 12/2008 |
| WO | WO 2009-140033 | 11/2009 |
| WO | WO 2010/036659 | 4/2010 |
| WO | WO 2010-096571 | 8/2010 |
| WO | WO 2011-103529 | 8/2011 |
| WO | WO 2011-125504 | 10/2011 |
| WO | WO 2012-102610 | 8/2012 |
| WO | WO 2013/039675 | 3/2013 |
| WO | WO 2013-096079 | 6/2013 |
| WO | WO 2013-096281 | 6/2013 |
| WO | WO 2013-096284 | 6/2013 |
| WO | WO 2014-042682 | 3/2014 |
| WO | WO 2014-164120 | 10/2014 |
| WO | WO 2014-164275 | 10/2014 |

OTHER PUBLICATIONS

Das et al, "Preparation of Activated Carbon from Green Coconut Shell and its Characterization", Sep. 2015, Chemical Engineering & Process Technology, vol. 6, Issue 5, pp. 1-7.*

Asano, "Formation and Properties of Plasma-Polymerized Carbon Disulfide Films", Japanese Journal of Applied Physics, Oct. 1983, vol. 22, No. 10, pp. 1618-1622.
Auaguard 200 and 325 Catalytic Activated Carbon, Jun. 2012, 1 page.
Blayden, "Solid Complexes of Carbon and Sulphur-I., Sulphurised Polymer Carbons", Carbon, 1967, vol. 5, No. 5, pp. 533-544.
Bock, "Gas-Phase Reactions. 55.[1] O=C=C=C=S: Synthesis and PE Spectrum", J. Am. Chem. Soc., 1986, vol. 108, No. 24, pp. 7844-7846.
Cal, "High temperature hydrogen sulfide adsorption on activated carbon II. Effects of gas temperature, gas pressure and sorbent regeneration", Carbon, 2000, vol. 38, No. 13, pp. 1767-1774.
Chang, "Preparation and Characterization of Carbon-Sulfur Surface Compounds", Carbon, 1981, vol. 19, pp. 175-186.
Cheng-Hsi, "Effects of Sulfur Impregnation Temperature on the Properties and Mercury Adsorption Capacities of Activated Carbon Fibers (ACFs)", Environ. Sci. Technol., 2001, vol. 35, No. 13, pp. 2785-2791.
Chou, "Solvatothermal Routes to Poly(carbon monosulfide)s Using Kinetically Stabilized Precursors", J. Am. Chem. Soc., 1997, vol. 119, No. 19, pp. 4537-4538.
Doxsee, "New Carbon Sulfides Based on 4, 5-Dimercapto-1,2-dithiole-3-thione ($\beta$-$C_3S_5^{2-}$-): [$C_3S_5$]$_n$, $C_6S_8$, and $C_5S_7$", Inorg., Chem., 1993, vol. 32, No. 24, pp. 5467-5471.
Feng, "Sulfurization of a carbon surface for vapor phase mercury removal—II: Sulfur forms and mercury uptake", Carbon, 2006, vol. 44, pp. 2998-3004.
Feng, "Sulfurization of carbon surface for vapor phase mercury removal—I: Effect of temperature and sulfurization protocol", Carbon, 2006, vol. 44, pp. 2990-2997.
Flammang, "Formation of thiophenethiols by flash vacuum pyrolysis of 1,6,6a$\lambda^4$-trithiapentalenes", J. Chem. Soc., Perkin Trans. 2, 1997, pp. 1261-1264.
Galloway, "Binary Carbon Sulfides Based on the $\alpha$-$C_3S_5$ Subunit and Related C-S-O, C-S-CI, and C-S-N Compounds", Inorg. Chem., 1994, vol. 33, No. 20, pp. 4537-4544.
Krishnan, "Uptake of Heavy Metals in Batch Systems by Sulfurized Steam Activated Carbon Prepared from Sugarcane Bagasse Pith", Ind. Eng. Chem Res., 2002, vol. 41, No. 20, pp. 5085-5093.
Krivoshei, "Conjugated Inorganic Carbon-based Polymers", Russian Chemical Reviews, 1981, vol. 50, No. 4, pp. 397-408.
Kurmaev, "Interlayer conduction band states in graphite-sulfur composites", Physical Review B, 2002, vol. 66, pp. 193402.1-193402.3.
Liu, "Optimization of High Temperature Sulfur Impregnation on Activated Carbon for Permanent Sequestration of Elemental Mercury Vapors", Environ. Sci. Technol., 2000, vol. 34, No. 3, pp. 483-488.
Liu, "Optimization of Sulfur Impregnation Protocol for Fixed-Bed Application of Activated Carbon-Based Sorbents for Gas-Phase Mercury Removal", Environ. Sci. Technol., 1998, vol. 32, No. 4, pp. 531-538.
Lopez-Gonzalez, "Effect of Carbon-Oxygen and Carbon-Sulphur Surface Complexes on the Adsorption of Mercuric Chloride in Aqueous Solutions by Activated Carbons", J. Chem. Tech. Biotechnol., 1982, vol. 32, pp. 575-579.
Macias-Garcia, "Adsorption of cadmium by sulphur dioxide treated activated carbon", Journal of Hazardous Materials, 2003, vol. B103, pp. 141-152.
Maier, "Thioxoethenylidene $C_2S$: A Matrix-Spectroscopic Study", European Journal of Organic Chemistry, 2004, vol. 2004, No. 20, pp. 4197-4202.
Muller, "Bis-substituted Tetrathiapentalenes—Novel Building Blocks for Extended Tetrathiafulvalenes and Conducting Polymers", Tetrahedron Letters, 1997, vol. 38, No. 18, pp. 3215-3218.
Pedersen, "3,6-Dihydro[1,2]dithiolo[4,3-c][1,2]dithiole-3,6-dithione and oxo analogues: a comparative study of the thermal (FVP) and electron ionization (EI) induced fragmentations", Journal of Chemical Society, Perkin Transactions 2, 1998, pp. 1403-1406.
Petit, "The effect of oxidation on the surface chemistry of sulfur-containing carbons and their arsine adsorption capacity", Carbon, 2010, vol. 48, pp. 1779-1787.

(56) References Cited

OTHER PUBLICATIONS

Petit, "The role of sulfur-containing groups in ammonia retention on activated carbons", Carbon, 2010, vol. 48, pp. 654-667.
Plank, "Thiolation of single-wall carbon nanotubes and their self-assembly", Applied Physics Letters, Oct. 11, 2004, vol. 85, No. 15, pp. 3229-3231.
Puri, "Carbon-Sulphur Surface Complexes on Charcoal", Carbon, 1971, vol. 9, pp. 123-134.
Schumaker, "Thiapen Chemistry.2.Synthesis of 1,3.4.6-Tetrathiapentalene-2,5-dione", Journal of American Chemical Society, Aug. 3, 1977, vol. 99, No. 16, pp. 5521-5522.
Sevilla, "Preparation and hydrogen storage capacity of highly porous activated carbon materials derived from polythiophene", International Journal of Hydrogen Energy, 2011, vol. 36, pp. 15658-15663.
Sulzle, "Experimental Evidence for the Existence of Polycarbon Oxide Sulfides $O(C_n)S$ (n=3-5) in the Gas Phase", Journal of American Chemical Society, 1991, vol. 113, No. 1, pp. 48-51.
Wade, "Preparation and characterization of high efficiency modified activated carbon for the capture of mercury from flue gas in coal-fired power plants", Fuel Processing Technology, 2012, vol. 97, pp. 107-117.
Wang, "Adsorption of Aqueous Hg(II) by Sulfur-Impregnated Activated Carbon", Environmental Engineering Science, 2009, vol. 26, No. 12, pp. 1693-1699.
Yamada, "Synthesis of new TTF(s)-fused donors and electrical conductivities of their radical cation salts", Synthetic Metals, 1997, vol. 86, pp. 1823-1824.
International Search Report for PCT International Application No. PCT/US2014/019904 dated Jun. 12, 2014, 4 pages.

\* cited by examiner

REMOVAL OF CHLORAMINE AND MERCURY FROM AQUEOUS SOLUTIONS

CROSS REFERENCE TO RELATED APPLICATIONS

This application is a national stage filing under 35 U.S.C. 371 of PCT/US2014/019904, filed Mar. 3, 2014, which claims priority to U.S. Provisional Application No. 61/777,013, filed Mar. 12, 2013, the disclosure of which is incorporated by reference in its/their entirety herein.

TECHNICAL FIELD

A filtration medium comprising material with the ability to remove both chloramine and mercury from aqueous solutions is described along with methods of removal.

SUMMARY

There is a desire to provide a filtration medium that is less expensive, more efficient, and/or has a higher capacity for the removal of chloramine and mercury than currently available filtration media. In some instances, it is desirable to identify filtration media that is able to be used effectively in applications requiring high throughput and short contact time between the aqueous stream and the filtration bed.

In one aspect, a method of removing chloramine and mercury from an aqueous solution is provided comprising: providing an aqueous solution comprising chloramine and mercury; and contacting the aqueous solution with a medium comprising a porous carbon substrate, wherein the porous carbon substrate comprises at least 1.5% by mass of sulfur.

In another aspect, a method of removing mercury from an aqueous solution is provided comprising: contacting an aqueous solution comprising at least 0.5 ppm of chloramine and mercury with a medium comprising a porous carbon substrate having at least 1.5% by mass of sulfur and collecting the eluate, wherein the eluate comprises less than 0.1 ppm of chloramine.

In still another embodiment, a method is provided comprising: providing a medium prepared by thermal treatment of (i) the surface of a carbonaceous solid and (ii) a sulfur-containing reactant compound; and contacting the medium with an aqueous solution comprising chloramine and mercury, wherein after contact with the medium, the aqueous solution has a decreased amount of chloramine and a decreased amount of mercury.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

Figure 1:
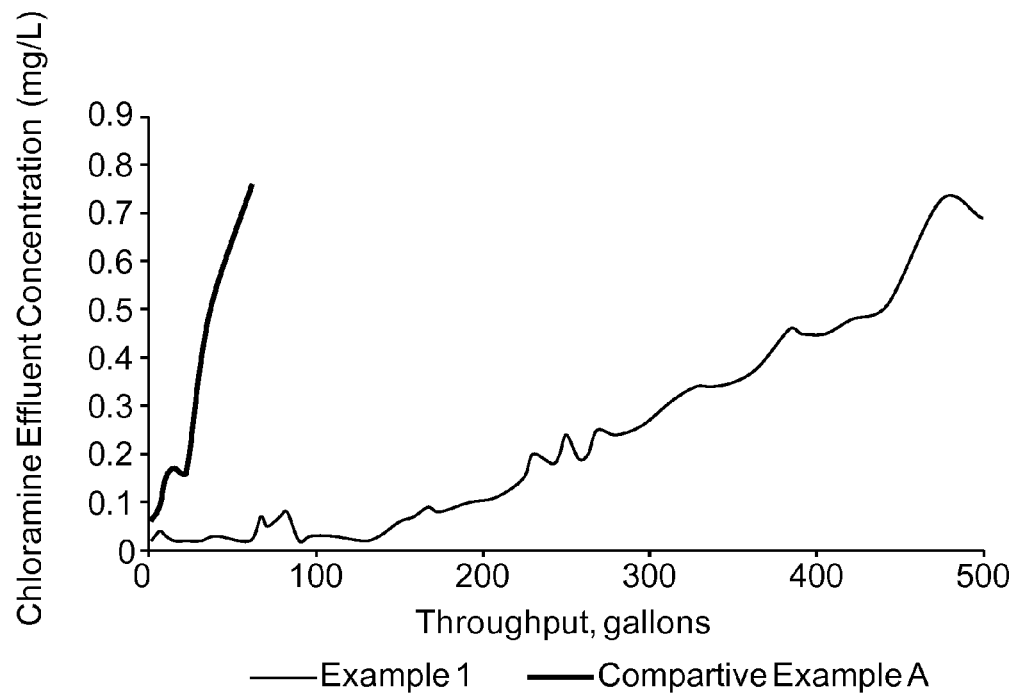
FIG. 1 is a chart of the amount of chloramine in the effluent versus gallons treated using Comparative Example A and Example 1.

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Municipal water supplies are purified or treated to produce water deemed safe for human consumption. Physical (e.g., filtration, distillation), biological (e.g., slow sand filters), and chemical processes (e.g., chlorination) may all be used to provide water meeting a certain standard. Chloramine is now being commonly used in low concentrations as a secondary disinfectant in municipal water distribution systems as an alternative to chlorination with free chlorine. However, concerns over taste and odor of chloramine treated water have led to an increase in the demand for water filters with chloramine removal capabilities.

A number of activated carbon particles having catalytic activity have been used to remove chloramine from aqueous streams. For example, U.S. Pat. No. 5,338,458 (Carrubba et al.) discloses an improved process for the removal of chloramine from gas or liquid media by contacting the media with a catalytically-active carbonaceous char. U.S. Pat. No. 6,699,393 (Baker et al.) shows improved chloramine removal from fluid streams, when the fluid stream is contacted with an activated carbon, which has been pyrolyzed in the presence of nitrogen-containing molecules, versus a catalytically-active carbonaceous char. WO Publ. No. 2011/125504 (Hitomi et al.) discloses an activated carbon having high catalytic activity containing 1.40-4.30 mass % oxygen, 0.90-2.30 mass % nitrogen, 0.05-1.20 mass % sulfur, and 0.40-0.65 mass % hydrogen, which is said to effectively break down chloramines Hitomi et al. discloses that if the amounts of these elements are too high, the catalytic activity of the activated carbon will be diminished.

Recently, Applicants have discovered carbon-based filtration media, which is less expensive, and/or more efficient at the removal of chloramine than currently available filtration media. Furthermore, this filtration media can be used effectively in high throughput applications, which have short contact time in the filtration bed.

It has now been discovered that in addition to the removal of chloramine, these media can be tuned to remove other contaminants in the aqueous streams, such as mercury, enabling a single filtration medium to remove multiple classes of impurities, in this case, chloramine and mercury.

Certain, undesirable metal compounds can be contaminants found in drinking water supplies, which are desirably removed, for example mercury. Typically, these undersirable metal compounds are present in trace amounts (e.g., from a few parts per billion to hundreds of part per billion. Traditionally, undesired metals are reduced in drinking water by adding a metal scavenging agent to the filtration media, such as those available under the trade designation "METSORB HMRP" by Graver Technologies LLC, Glasgow, DE or "ATS" by BASF Corp., Florham Park, N.J. However, these scavenging materials can be expensive and they do not contribute to the removal of other contaminants that may be present in the water such as chloramine, chlorine, and/or organic compounds. Furthermore, the amount of these metal scavengers used is typically based on its capacity for mercury, since this is a more difficult metal to remove and it is a contaminant of high concern.

There is, therefore, a desire to have a media that can remove both chloramine and mercury. The objective of the present disclosure is to provide such a medium, and preferably provide a medium having high capacity for removal of both chloramine and mercury.

In the present disclosure, a reactant compound comprising sulfur and a carbon substrate are contacted and exposed to thermal treatment to form the filtration medium of the present disclosure.

Reactant Compound

The reactant compound used to prepare the filtration medium of the present disclosure comprises sulfur. In embodiment, the reactant compound is a sulfur-containing reactant compound, or a sulfur and nitrogen-containing reactant compound. As used herein, a sulfur-containing reactant compound refers to any reactant containing sulfur, which can include elemental sulfur. In one embodiment, the reactant compound does not comprise a metal salt.

In one embodiment, the reactant compound has a molecular weight of no more than 800, 600, 500, 400, or even 200 grams/mole. In one embodiment, the reactant compound has a molecular weight of at least 32, 50, or even 100 grams/mole. The molecular weight of the compound needs to be appropriate for the nature of the carbon substrate used.

Sulfur-Containing Reactant Compound

WO Appl. No. US2012/052502, herein incorporated by reference in its entirety, discloses the use of sulfur-containing compounds such as elemental sulfur, $SO_2$, $SOCl_2$, $SO_2Cl_2$, $CS_2$, COS, $H_2S$, and ethylene sulfide and sulfur analogs of epoxides, which are thermally treated with a carbon substrate.

Sulfur and Nitrogen-Containing Reactant Compound

U.S. Prov. Pat. Appl. No. 61/699,324, filed 11 Sep. 2012, herein incorporated by reference in its entirety, discloses the use of sulfur and nitrogen-containing salts. In one embodiment, the reactant compound is a salt is represented by the formula $[C]^{+y}_x[A]^{-x}_y$, wherein [C] is a cation; [A] is an anion; and x and y are independently at least 1. These salts include at least one sulfur atom and at least one nitrogen atom.

In one embodiment, the cation [C] is a conjugate acid of a nitrogen-containing base and contains at least one nitrogen atom. Exemplary cations include: ammonium and alkylated or arylated derivatives thereof (e.g., $(NH_4)^+$, $(NH_3CH_3)^+$, etc.), guanidinium, imidazolium, morpholinium, anilinium, thiomorpholinium, pyridinium, and combinations thereof. In another embodiment, the cation [C] contains at least one sulfur atom. Exemplary cations include: trimethylsulfonium, trimethylsulfoxonium, and combinations thereof. In yet another embodiment, the cation [C] contains at least one sulfur atom and at least one nitrogen atom. An exemplary cation includes phenothazinium.

In one embodiment, the anion [A] contains at least one sulfur atom. Exemplary anions include: sulfate, bisulfate, sulfite, bisulfate, polysulfide, sulfamate, polythionates [i.e. $Sx(SO_3)_2^{2-}$], and combinations thereof. In another embodiment, the anion [A] contains at least one nitrogen atom. Exemplary anions include: cyanate, guanidine, imidazole, pyridine, triazole, and combinations thereof. In yet another embodiment, the anion [A] contains at least one sulfur atom and at least one nitrogen atom. Exemplary anions include: thiosulfate, thiocyanate, and combinations thereof.

In one embodiment, the salt, $[C]^{+y}_x[A]^{-x}_y$, may be a metal containing salt, e.g., potassium thiocyanate or sodium thiocyanate.

In another embodiment, the reactant compound containing both sulfur and nitrogen is not a salt. Exemplary reactant compounds include: thiomorpholine, phenothiazine, 2-mercaptopyridine, thiourea, and combinations thereof.

Additional Compounds

In addition to the sulfur-containing reactant compound and/or the sulfur- and nitrogen-containing reactant compound used in the thermal treatment with the carbon substrate, additional compounds such as a nitrogen-containing reactant compound and/or an oxygen-containing reactant compound may also be used to achieve the medium of the present disclosure.

In one embodiment, oxygen may also be included in addition to the sulfur- and/or sulfur- and nitrogen-containing reactant compound.

In one embodiment, the oxygen may be part of the sulfur- and/or the sulfur- and nitrogen-containing reactant compound.

In one embodiment, the surface of the carbon substrate comprises oxygen. The carbon substrate, as received, may contain chemically significant amounts of oxygen attached to surface carbon atoms. For example, according to X-ray photoelectron spectroscopic (XPS) analysis, granular activated carbon available under the trade designation "RGC" by Mead Westvaco Corp, Richmond, Va. contains about 2.9 atomic percent of oxygen. This amount of oxygen may be sufficient for the present disclosure but, when higher amounts of surface oxygen are desired, additional oxygen may be incorporated into the carbon substrate.

In one embodiment, oxygen may be added to the carbon substrate before exposure to the sulfur- and/or nitrogen-containing reactant compound. For example, the carbon substrate can be heated in air or treated with aqueous nitric acid, ammonium persulfate, ozone, hydrogen peroxide, potassium permanganate, Fenton's Reagent, or other well known oxidizing agents.

In another embodiment, additional oxygen can be incorporated into the medium of the present disclosure by carrying out the thermal treatment between the carbon substrate and the sulfur- and/or sulfur- and nitrogen-containing reactant compound in the presence of air or water. The amount of air used must be limited to prevent combustion of the carbon. Additional oxygen may also be supplied by addition of water or steam, which can be added during the heating reaction or may be present on the surface of the carbon substrates, such as in the case of high surface area carbonaceous materials, particularly hydrophilic oxidized carbons, which chemisorb water. Oxygen may be added during the heating reaction in the form of dioxygen, sulfur dioxide, carbon dioxide, or combinations thereof.

In addition to adding an oxygen source during thermal treatment of the carbon substrate and the sulfur- and/or sulfur- and nitrogen-containing reactant compound, in an alternative embodiment, the thermal treatment is conducted in the absence of added oxygen.

Carbon Substrate

The carbon substrate may be a granular material, a powder material, a fiber, a tube, a web or a foam.

The morphology of the carbon substrate is not particularly limited and may include a non-particulate, a particulate, or an aggregate. A non-particulate carbon substrate is a support that is not composed of discernible, distinct particles. A particulate carbon substrate is a support that has discernible particles, wherein the particle may be spherical or irregular in shape (including e.g., non-spherical, cubic, faceted particles, and/or other geometric shapes) and has an average diameter of at least 0.1, 1, 5, 10, 20, or even 40 micrometers (μm) to at most 75 μm, 100 μm, 500 μm, 1 millimeter (mm), 2 mm, 4 mm, 6.5 mm, or even 7 mm. An aggregate (or a composite) is formed by the joining or conglomeration of smaller particles with one another or with larger carrier particles or surfaces. The aggregates may be free standing (self-supporting against gravity).

Typically, the morphology of the carbon substrate will be selected based on the application. For example, particulate with a large particle size is desirable when the medium of the present disclosure is used in applications requiring low pressure drops such as in beds through which gases or liquids are passed. In another example, particle sizes of about 20 to 200 μm may be preferable when used in a carbon block monolith.

The size of the pores of the carbon substrate can be selected based on the application. The carbon substrate may be microporous carbon (having pore widths smaller than 2 nanometers), macroporous carbon (having pore widths between 2 and 50 nanometers), mesoporous carbon (having pore widths larger than 50 nm), or a mixture thereof.

In one embodiment, the carbon substrate is comprised of activated carbon, in other words, carbon that has been processed to make it highly porous (i.e., having a large number of pores per unit volume), which thus, imparts a high surface area.

In one embodiment, it is preferable for the carbon substrate is porous. Preferably the carbon substrate has a high surface area (e.g., at least 100, 500, 600 or even 700 m$^2$/g; and at most 1000, 1200, 1400, 1500, or even 1800 m$^2$/g based on BET (Brunauer Emmet Teller method) nitrogen adsorption). High surface areas may be made available using a highly porous carbon substrate such as an activated carbon substrate.

Activated carbons may be generated from a variety of materials, however most commercially available activated carbons are made from peat, coal, lignite, wood, and coconut shells. Based on the source, the carbon can have different pore sizes, ash content, surface order, and/or impurity profiles. For example, coconut shell-based carbon has predominantly a micropurus pore size, whereas a wood-based activated carbon has a predominately mesoporous or macroporous pore size. For example, coconut shell- and wood-based carbon typically have ash contents less than about 3% by weight, whereas coal-based carbons typically have ash contents of 4-10% by weight or even higher.

In one embodiment, the porous carbon substrate used in the present disclosure is predominately microporous, meaning that 65, 75, 80, 85, 90, 95, or even 99% of the pores of the carbon substrate are microporous, however some or the pores may be larger than microporous.

Commercially available carbon substrates include: activated wood-based carbon available under the trade designation "NUCHAR RGC", by Mead Westvaco Corp, Richmond, Va.; wood-based carbon available under the trade designation "AQUAGUARD" by Mead Westvaco Corp; activated coconut shell-based carbon available under the trade designation "KURARAY PGW" by Kuraray Chemical Co., LTD, Okayama, Japan; and coal-based carbon available under the trade designations "CARBSORB" and "FILTRA-SORB" by Calgon Carbon Corp., Pittsburgh, Pa.

Thermal Treatment

Reactions of elemental carbon typically exhibit large activation energies and so are conducted at high temperature. Reactions used to introduce the reactant compounds into the carbon substrate surface may be conducted at a temperature sufficient to thermally decompose the sulfur chemical species (and additional reactant species, if present) as well as enable their reaction with the carbon substrate. Exemplary temperatures include at least 200, 250, 300, 400, or even 500° C.; and at most 650, 700, 800, 900, 1000, 1200, or even 1400° C. The resulting product herein is referred to as the reaction product or medium.

Generally the temperature at which to conduct the thermal treatment may be determined, by first analyzing the reactant compound by differential thermal analysis/thermal gravimetric analysis (DTA/TGA) performed under controlled conditions (atmosphere and heating rate) to determine its thermal decomposition behavior. Then trials may then be performed by heat treating the carbon substrate and the reactant compound at various temperatures beginning with the onset temperature of decomposition to determine at what point and under what conditions (temperature, time and atmosphere) the most active material is formed.

The thermal treatment may occur in an air environment. However, to control combustion, sources of oxygen, such as air or water, may be excluded (e.g., by pulling a vacuum) or replaced by an inert gas such argon or nitrogen in which the oxygen concentration is less than 2000 ppm (parts per million), 200 ppm, or even less than 50 ppm.

The reactant compound may be used in the solid, liquid, or gas form. A single reactant compound may be used or more than one reactant compound may be used (for example, a sulfur-containing reactant compound and a nitrogen-containing reactant compound). Reaction temperatures, which are above the boiling point of the reactant compound(s) may be used.

In one embodiment, the reactant compound(s) may be combined with the carbon substrate by dry mixing and then exposed to the thermal treatment (heated). The amount of reactant compound added to the carbon support is determined through experimentation to yield sufficient sulfur (and optionally nitrogen and/or oxygen) present in the end product.

In another embodiment, the reactant compound(s) may be melted or dissolved or dispersed in a solvent (e.g., water or methanol or mixtures of solvents) and the liquid is used to wet the carbon substrate, impregnating the carbon substrate with the reactant compound. Such impregnation can be accomplished using simple techniques, such as spraying the reactant compound-containing solution onto the carbon substrate or melting the reactant compound and contacting it with the carbon substrate. When forming a solution using a solvent, the reactant compound is dissolved in the solvent to its solubility limit to maximize the amount of sulfur and/or nitrogen present, although lesser amounts may be used so long as there is sufficient sulfur and/or nitrogen present in the end product to produce an active removal material.

Then, the impregnated carbon substrate is heated to generate the media of the present disclosure. The decomposition of the reactant compound on the surface of the carbon substrate is thought to produce a reactive sulfur and optionally a reactive nitrogen species. It is thought that the impregnation of the carbon substrate with the reactant compound would enable a more evenly dispersed reactive surface on the carbon substrate, yielding a more uniform and better performing medium.

In thermal treatment with a metal salt a thermolysis process can be used, which involves heating a metal salt at or above the temperature at which the metal salt begins to lose metal-bound water, if present, and at which the salt portion of the compound begins to decompose. As used herein a "thermolysis product" refers to a product that results from the dissociation or decomposition of a compound by heat. This thermolysis process is believed to change the nature of the metal salt to a material having a different stoichiometry and composition and different chemical properties, wherein at least a portion of the salt is thermally decomposed and is removed by volatilization as a gas.

Described below are specific embodiments of thermal treatment to generate the reaction product disclosed herein.

In one embodiment, a carbon substrate is impregnated with a reactant compound comprising both sulfur and nitrogen (e.g., ammonium sulfate, ammonium hydrogen sulfite and ammonium thiosulfate) and then thermally treating impregnated carbon under a nitrogen atmosphere to a temperature above the decomposition point of the compound and preferably higher than about 445° C., 500° C., 550° C., or even 800° C., followed by cooling under nitrogen.

In one embodiment, a carbon substrate is treated with a sulfur-containing reactant compound (e.g., elemental sulfur, $H_2S$, $SO_2$, and ammonium sulfur-containing compounds) at temperatures of 550° C. or higher. Elemental sulfur may be preferable, as a sulfur-source because it may be used in the absence of solvent and without need for high pressures of gas.

Reaction Product

The reaction product of the carbon substrate and the reactant compound comprising sulfur is referred to herein interchangeable as the reaction product or medium.

The reaction product of the present disclosure may be obtained via solid-gas (or solid-vapor) chemistry. In certain reactions of this class only the outer portions of the carbon substrate are exposed to the reactive gas because diffusion of the reactant compound into the inner pores of the carbon substrate can be slow relative to the treatment time. Additionally, in some cases, reactions can become self-limiting in that an overlayer of product inhibits inward diffusion of the gas. In such cases, the new compounds that form may be confined to regions near the surface and comprise a surface compound (e.g., 10 nanometers (nm) or less on the carbon substrate).

By using a solid-vapor thermal treatment process several advantages may be realized. Because the reaction may be solventless or at least free of organic solvent, no drying operation is needed to isolate the product. Further, there are generally no non-volatile by-products that remain to clog small pores in the solid. If no solvent is used, the process as described herein can be envisioned to run as a continuous process, which can reduce cost and/or increase throughput. The solid-vapor process of this disclosure permits penetration of small molecule reactants into micropores and niches formed by highly irregular surfaces. This results in an advantageous, even distribution of sulfur and/or nitrogen species.

In another embodiment, the reactive compound is melted, dissolved in a liquid, or suspended in solution and the resulting liquid is used to impregnate the carbon substrate. In this embodiment, the reactive species is dispersed throughout the carbon substrate and is thus able to react with the carbon substrate in the thermal treatment yielding a uniformly treated substrate. Advantageously, reactive species that are not easily vaporized or are fine powders can be used. Further, because the reactive compound is impregnated into the carbon substrate as a liquid without the concern of gas diffusion, larger carbon substrates can be uniformly treated.

When the carbon substrate is a large particle, a core-shell structure results, where the core is the carbon substrate, which is covered by a shell or second layer comprising the reaction product resulting from the thermal treatment of the reactant compound with the carbon substrate.

Because the reaction disclosed herein is a surface reaction, when the carbon substrate is in the form of small particles with high surface area (e.g., RGC powder nominally −325 mesh, having a nominal surface area of 1400-1800 $m^2/g$), then the surface and interior of the particle may become coextensive. In one instance there may be no apparent chemical distinction between the outer surface and the interior of the particle. In another instance, the sulfur and/or nitrogen content on the bulk can approach or even exceed that on the surface.

In one embodiment of the present disclosure, the carbon of the carbon substrate, and the sulfur, and optionally the nitrogen, and/or oxygen (if present), chemically interact with one another, meaning, that these elements may be combined chemically (i.e., covalent chemical bonding between contiguous elements) or there may be weaker interactions between non-contiguous elements, such as hydrogen bonding.

In one embodiment, when the reaction product comprises sulfur, at least 15%, 20%, 25%, 30%, or even 50% of the sulfur in the reaction product is in an oxidation state higher than 0. For example in a +1, +2, +4, or even +6 oxidation state. Because the reaction product of the present disclosure comprises at least 1.5% by mass of sulfur, in one embodiment, at least 0.2%, 0.5%, or even 1% by mass of the medium comprises sulfur in an oxidation state higher than 0 based on XPS surface analysis.

Because not all of the sulfur (and/or nitrogen, if present) from the reactant compound is incorporated into the carbon substrate surface (e.g., some may be converted to COS or $H_2S$), it may be important to analyze the resulting composition to determine the atom fraction of carbon, oxygen, sulfur, and nitrogen on the carbon substrate surface of the medium.

If the carbon substrate is highly porous, the reaction product of the reactant compound and the carbon substrate can be analyzed by combustion analysis to determine how much carbon, hydrogen, nitrogen, and sulfur are present.

In one embodiment, the medium of the present disclosure comprises carbon, and sulfur wherein the sulfur content of the medium is at least 1.5, 2.0, 3.0, 4.0, 6.0, 8.0 or even 10.0 mass % based on the total mass of the reaction product.

In one embodiment, the medium of the present disclosure comprises carbon and nitrogen wherein the nitrogen content is greater than 0.5, 1.0, 1.5, 2.0, 2.4, 2.5, 2.7, 3.0, 4.0, 5.0, 7.0, or even 10.0 mass % nitrogen based on the total mass of the reaction product.

In one embodiment, the medium of the present disclosure comprises more than 4.0, 4.5, 5.0, 7.0, 9.0, 10.0, 12.0, 15.0, or even 22.0 mass % of the sum of nitrogen and sulfur based on the total mass of the reaction product.

In one embodiment, the medium of the present disclosure is substantially free of hydrogen, comprising less than 0.40, 0.30, 0.20, 0.10, 0.05, or even 0.01 mass % hydrogen based on the total mass of the reaction product.

In one embodiment, the medium of the present disclosure is substantially free of metals, in other words, comprising less than 1, 0.5, 0.1, or even 0.05 mass % of metal based on the total mass of the reaction product.

In one embodiment, metals (such as calcium, magnesium, iron, etc.) may be present in low levels in the media of the present disclosure due to low levels of metals intrinsic to plant-derived materials such as carbons made from nut shells or coal.

In one embodiment, the medium of the present disclosure comprises $CN_pS_r$, wherein p and r are independently greater than 0. In one embodiment, p can be greater than 0.004, 0.008, 0.013, 0.020, 0.025, 0.035, 0.045, 0.065, or even 0.10, and r can be greater than 0.004, 0.006, 0.008, 0.015, 0.025, 0.035, or even 0.42.

In one embodiment, the medium of the present disclosure comprises $CO_xS_y$, where in one embodiment, x is 0 or is at least 0.005, 0.01, 0.02, 0.03, 0.04, or even 0.05; and at most 0.07, 0.08, 0.09, 0.1, 0.12, 0.15, or even 0.2; and y is at least 0.001, 0.005, 0.01, 0.02, 0.03, 0.04, 0.05, or even 0.06; and is at most 0.12, 0.14, 0.15, 0.16, 0.18, 0.2, 0.22, 0.25, 0.3, 0.35, or even 0.4. In one embodiment, the carbon substrate has a surface consisting essentially of $CO_xS_y$, meaning that the surface necessarily includes carbon, oxygen, and sulfur and may also include other atoms so long as the other atoms do not materially affect the basic and novel properties of the invention. In other words, besides carbon, oxygen, and sulfur, the surface of the substrate comprises less than 10% or even less than 5% total of other atoms. These other atoms may originate in the starting materials and/or the atmosphere used during the thermal treatment. Impurities are typically less than 5%, 2%, 1%, 0.1%, 0.05%, or even 0.01% of particular impurity atom based on the weight of the composition.

In one embodiment, the carbon, oxygen, and sulfur of the reaction product chemically interact with one another, meaning, that these elements may be combined chemically (i.e., covalent chemical bonding between contiguous elements) or there may be weaker interactions between non-contiguous elements, such as hydrogen bonding.

In one embodiment, the compositions of the present disclosure have high thermal stability. For example, with the carbon substrate comprising $CO_xS_y$, there is no significant weight loss under nitrogen at temperatures up to 800° C., well above the boiling point of sulfur, indicating that these compositions are not mere physical mixtures of starting materials.

Based on the analysis of compositions of the present disclosure, in at least one embodiment, the sulfur is and oxygen are combined chemically on the surface of the carbon substrate. The oxygen and carbon are an integral part of the surface of the carbon substrate and are not easily removed by heating to 400° C. The nature of the structure and bonding is complex. Carefully deconvoluted XPS (X-ray photoelectron spectroscopy) spectra of the carbon substrate comprising $CO_xS_y$, reveal that sulfur is in four different chemical environments with $S2p_{3/2}$ binding energies of about 162.0, 164.3, 165.8 and 168.9 eV [C(1s)=285.0 eV]. They therefore contain chemically combined sulfur in three formal valence states [S(VI), S(IV) and S(II)] and four different chemical environments. These chemical environments are: (1) S(VI) as in $SO_4^{2-}$ or organic sulfones, C—$SO_2$—C(2) S(IV) as in organic sulfoxides, C—SO—C, (3) S(II) as in thiophene and (4) S(II) as in organic sulfides, C—S—C or disulfides, C—S—S—C.

In one embodiment, the reaction product has a bulk density of greater than 0.50, 0.57, 0.60, or even greater than 0.65 g/cc.

In one embodiment, the reaction product has an ash content of less than 4% or less than 3%, or even less than 2%.

Because sulfur is associated with a rotten egg smell, and the present disclosure is directed toward use in treatment of aqueous solutions (e.g., drinking water), one may be dissuaded from using sulfur-containing in materials for treatment of drinking water. However, advantageously, although the reaction products disclosed herein comprise sulfur, and in some instances large amounts of sulfur (e.g., 10% by wt), the reaction products do not have a noticeable smell.

Carbon Block

In one embodiment, the reaction product is disposed in a matrix to form a filter. The matrix may be a web, a polymer-containing composite block, on the surface of a tube, or in another structure that enables aqueous solutions to pass therethrough. In one embodiment, the reaction product may be blended and compressed with a binder material, such as a polyethylene, e.g., an ultra high molecular weight polyethylene, or a high-density polyethylene (HDPE). In another embodiment, the reaction product may be loaded into web, such as a blown microfiber, which may or may not be compacted such as described in U.S. Publ. No. 2009/0039028 (Eaton et al.), herein incorporated in its entirety.

In one embodiment, the reaction product is sensitive to the reduction of mercury. In one embodiment, the reaction product is not sensitive to the reduction of lead in an aqueous solution.

In one embodiment, the matrix, including the reaction product of the present disclosure, further comprises particles of titanium, in the form or oxides or silicates. These particles may be added to the matrix to improve removal of undesirable metals such as lead. Typically, these particles have a sizing of 20 to 50 microns. If used in conjunction with the reaction products disclosed herein, a reduced amount of titanium particles may be used.

In one embodiment, the filtration media of the present disclosure comprising the reaction product disclosed herein are substantially free of particles of titanium, in the form or oxides or silicates or other metal scavenging compounds. As used herein, substantially free of metal scavenging means less than 5, 4, 3, 2, or even 1% by weight is present in the filtration media.

The loading, expressed as weight of the reaction product by the total weight of the filter (comprising the reaction product, the matrix and additional additives), can vary depending on matrix used. In one embodiment, the amount of reaction product comprises at least 10, 25, 40, 50, 60, 75, or even 80%; at most 90, 92, 95, 97, or 99%, or even 100% mass of the filter. For example, when carbon blocks are used, the filter may comprise about 50-85% mass of the reaction product, while for a carbon loaded web, the filter may comprise about 80-95% mass of the reaction product.

In one embodiment, the reaction product is disposed in a fluid conduit, wherein the fluid conduit is fluidly connected to a fluid inlet and a fluid outlet. Such systems may include packed beds.

Removal

The medium of the present disclosure may be used to remove chloramines and mercury from a fluid stream, particularly a liquid fluid stream, more specifically, an aqueous fluid stream.

Chloramines are formed from the aqueous reaction between ammonia and chlorine (hypochlorite). Thus, adding ammonia ($NH_3$) to a chlorination system converts chlorine to chloramines Specifically, monochloramine, hereafter referred to as "chloramine," in low concentrations arise from the disinfection of potable water sources. In one embodiment, after contacting the aqueous solution with the medium of the present disclosure, as disclosed herein, the resulting aqueous solution comprises a reduced amount of chloramines.

Undesirable metals found in drinking water supplies include mercury. Mercury is more difficult to remove than lead using titanium based media typically used in point of use water filters. The National Sanitation Foundation NSF/ANSI standard 53 ("Drinking water Treatment Units, Health Effects") can be used to test for the reduction of mercury. A measure of the removal capability of a filtration media for removal is to challenge a filtration media with 6 ppb mercury in water and measure the gallons treated until breakthrough over 2 ppb is observed.

In the Applicants' previous filings, referenced above, it was found that thermally treating a carbon substrate in the presence of various reactants, such as sulfur containing compounds and/or sulfur- and nitrogen-containing compounds, resulted in materials that were active for chloramine removal. These materials were found to have similar or even higher activity for removal of chloramine from aqueous solutions than untreated activated carbon, including those commercially marketed for chloramine removal. It has now been found that in addition to removal of chloramine, the reaction products can also reduce the level of certain, undesirable metals, specifically mercury, in aqueous samples. This is advantageous because a single component can serve multiple uses (remove chloramine and mercury, among others) and the traditional metal scavenging compounds added to filter can be expensive. Further, it is unexpected that one treatment of carbon, as disclosed herein, can be used to introduce the capability of the carbon substrate to remove two very dissimilar chemicals, namely, chloramines and mercury.

The medium of the present disclosure reduces the amount of chloramine and mercury in an aqueous solution, when the solution is contacted with the medium. In one embodiment, the aqueous solution comprises from 3 ppm to less than 0.5 ppm chloramine. Upon contact with the medium, the aqueous solution has a reduced chloramine content to 0.1 ppm or less. For example, in one embodiment, the amount of chloramine is decreased by at least 70%, 75%, 80%, 85%, 90%, 95%, 99%, or even 100% when challenged with a solution comprising 3 ppm chloramine. In one embodiment, the aqueous solution comprises about 6 ppb mercury, which upon contact with the medium, the aqueous solution has a reduced mercury content of 2 ppb or less. For example, in one embodiment, the amount of mercury is decreased by at least 50%, 60%, 65%, 70%, 75%, 80%, 85%, 90%, 95%, 99%, or even 100% when challenged with a solution comprising 15 ppb chloroform.

In one embodiment, the medium of the present disclosure has a high capacity for removing chloramine (e.g., at least 0.1 g/cc, or even 0.2 g/cc based on the amount of chloramine removed per volume of reaction product). In one embodiment, the filter media made using the medium of the present disclosure has a high capacity for removing mercury-containing metal compounds (e.g., at least 0.00025 g/cc or even 0.0005 g/cc based on the amount of mercury removed per volume of reaction product). The capacity, and thus throughput of water, is a key for designing a filter with an acceptably long service life.

Capacity (or service life) of the carbon block sample comprising the reaction product disclosed herein is reported as the throughput attained before the concentration of chloramines in the effluent rises above 0.5 mg/L. In one embodiment, the medium when challenged with 3 ppm chloramine, will have a capacity of at least 0.05, 0.1 or even 0.19 g chloramine per gram of the medium at 3 ppm for chloramine at an empty bed contact time of 9.5 sec.

In designing filtration media, it is also advantageous to have media that is able to quickly react with the contaminant of interest. It has been found that filtration media made using the reaction product disclosed herein can provide a fast reaction rate, and thus yields good performance for the removal of chloramines and/or certain, undesirable metal compounds with empty bed contact times as low as 3 to 5 seconds. Empty bed contact time is defined as the volume of the filter in gallons divided by the water flow rate in gallons per second. The ability to quickly and effectively remove chloramines and/or undesirable metal compounds is a key to reducing the required size of filters. In many applications space is limited, so "miniaturizing" filter volume is a key for customer acceptance. Applications where space is limited include refrigerator filters, end of faucet filters, countertop filters, filters for portable and home dialysis systems, gravity flow devices (pitchers) and point-of-entry house filters. Therefore, the media disclosed herein can extend the range of applications where chloramine and heavy metal compound removal from water is feasible and desirable for the customer. Currently, such filters for the above mentioned applications would be too large or too low in capacity to be practical for a broad range of users.

The reaction product as disclosed herein may be useful for the following applications: point-of-use or point-of-entry filters for home or commercial use, and filters for dialysis water for the removal of contaminants (such as chloramine, mercury, etc.) in aqueous streams.

The reaction product as disclosed herein may be used to not only remove chloramine and/or organic compounds, it may also be used to remove other contaminants as well. As shown in U.S. Prov. Appl. Nos. 61/777,017 and 61/875,998 (filed on the same day as the present application, herein incorporated by reference in their entirety), the reaction product can be used to remove organic compounds (such as trihalomethanes like chloroform) and/or chlorine. In some instances, the end-user may not know what contaminants are in their aqueous stream due to changes in the water supply, exposure of the aqueous solution to contaminants from a treatment source to the point of use. Thus, multiple filters, specific to each contaminant, may be needed. Having a filtration media that is able to remove a variety of contaminants may save on foot-print size and/or cost. In some instances, the treatment of the water supply may change, known or unknown to the end-user, and thus it would be advantageous to have a filtration media that does not need to be changed with changes that occurred upstream.

In one embodiment of the present disclosure, a method of removing various contaminants from an aqueous solution is provided comprising: providing an aqueous solution comprising at least two contaminants selected from: chloramine, chlorine, an organic compound (such as trihalomethanes, e.g., chloroform), and mercury; and contacting the aqueous solution with a medium comprising a porous carbon substrate, wherein the porous carbon substrate comprises at least 1.5% by mass of sulfur, whereby the medium reduces the amount of the at least two contaminants.

In another embodiment, a medium is disclosed comprising carbon and sulfur, wherein the medium has the capability to remove at least one of: chloramine, free chlorine, mercury, and trihalomethane (exemplified by chloroform), wherein a composite carbon block filter comprising the medium and a binder has a filtration capacity of at least 5000 liters of water per liter of carbon block volume and wherein the filtration capacity is measured at about 2.4 sec (±5%) empty bed contact time when tested according to the National Sanitation Foundation Standard 53 (for mercury and chloroform) and 42 (for chloramine and chlorine) protocols. For disclosure of the testing methods, refer to the Example Section below and the methods disclosed in U.S.

Prov. Appl. Nos. 61/777,017 and 61/875,998 (filed on the same day as the present application, herein incorporated by reference in their entirety).

In another embodiment of the present disclosure, a medium for filtration of aqueous solutions is provided, wherein when tested at about 2.4 sec (±5%) the empty bed contact time according to the National Sanitation Foundation Standard 53 and 42 protocols the medium comprises the following capacity: at least 0.05, 0.06, 0.07, 0.08, or even 0.1 g chloramine per gram of the medium when challenged with 3 ppm chloramine, at least 0.5, 0.7, 0.8, or even 1 g chlorine per gram of the medium when challenged with 2 ppm chlorine; at least 0.002, 0.003, 0.004, or even 0.0050 g organic compound per gram of the medium when challenged with 150 ppb organic compound (as measured by chloroform); and at least 0.002, 0.003, 0.004, 0.005 or even 0.007 g mercury per gram of the medium when challenged with mercury. For disclosure of the testing methods, refer to the Example Section below and the methods disclosed in U.S. Appl. Nos. 61/777,017 and 61/875,998 (filed on the same day as the present application, herein incorporated by reference in their entirety).

Exemplary embodiments of the present disclosure include:

Embodiment 1. A method of removing chloramine and mercury from an aqueous solution comprising:
providing an aqueous solution comprising chloramine and mercury; and
contacting the aqueous solution with a medium comprising a porous carbon substrate,
wherein the porous carbon substrate comprises at least 1.5% by mass of sulfur.

Embodiment 2. The method of embodiment 1, wherein the porous carbon substrate is predominately microporous.

Embodiment 3. The method of any one of the previous embodiments, wherein the surface of the porous carbon substrate comprises a species of $CO_xS_y$, wherein x is no more than 0.1, and y is 0.005 to 0.3.

Embodiment 4. The method of any one of the previous embodiments, wherein the porous carbon substrate further comprises nitrogen and the sum of the sulfur and nitrogen is at least 4.0% by mass.

Embodiment 5.The method of any of the previous embodiments, wherein the porous carbon substrate is an activated carbon.

Embodiment 6.The method of any of the previous embodiments, wherein at least 0.2% by mass of the medium comprises sulfur in an oxidation state higher than 0 based on XPS surface analysis.

Embodiment 7. The method of any of the previous embodiments, wherein the medium has a bulk density of greater than 0.6 g/cc.

Embodiment 8.The method of any of the previous embodiments, wherein the medium has an ash content less than 3%.

Embodiment 9.The method of any of the previous embodiments, wherein the medium is disposed within a matrix, wherein the matrix is a polymer matrix.

Embodiment 10.The method of embodiment 9, wherein the medium further comprises particles comprising titanium.

Embodiment 11. A method of removing organic compounds from an aqueous solution comprising:
contacting an aqueous solution comprising at least 0.5 ppm of chloramine and mercury with a medium comprising a porous carbon substrate having at least 1.5% by mass of sulfur and collecting the eluate, wherein the eluate comprises less than 0.1 ppm of chloramine.

Embodiment 12. A method comprising:
providing a medium prepared by thermal treatment of (i) the surface of a carbon support and (ii) a reactant compound comprising sulfur; and
contacting the medium with an aqueous solution comprising chloramine and mercury,
wherein after contact with the medium, the aqueous solution has a decreased amount of chloramine and a decreased amount of the mercury.

Embodiment 13. The method of embodiment 12, wherein the thermal reaction product further comprises (iii) a reactant compound comprising nitrogen.

Embodiment 14.The method of any one of embodiments 12-13, wherein the reactant compound comprising sulfur is selected from at least one of: elemental sulfur, sulfur oxides, hydrogen sulfide, salts containing oxyanions of sulfur, and combinations thereof.

Embodiment 15.The method of any one of embodiments 12-14, wherein the thermal treatment is conducted at a temperature greater than 445° C. in an inert atmosphere.

Embodiment 16.The method of any one of embodiments 12-15, wherein the amount of chloramine is decreased by at least 80% when challenged with a solution comprising 3 ppm chloramine.

Embodiment 17. The method of any one of embodiments 12-16, wherein the amount of mercury is decreased by at least 60% when challenged with a solution comprising 6 ppb mercury.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, hr=hour, in=inch, kg=kilograms, min=minutes, mol=mole; M=molar, cc=$cm^3$, cm=centimeter, mm=millimeter, ml=milliliter, L=liter, N=normal, psi=pressure per square inch, MPa=megaPascals, and wt=weight.

Methods

Chloramine Test

The chloramine content of water samples was determined from the total chlorine content in the samples. Total chlorine ($OCl^-$ and chloramines) concentration was measured by the DPD Total Chlorine Method, Hach Method 8167, which Hach Company claims to be equivalent to USEPA Method 330.5. The free chlorine (OCl—) concentration was periodically measured by the DPD Free Chloramine Analysis, Hach Method 8021, which Hach company claims is equivalent to EPA Method 330.5. Free chlorine was maintained at a negligible concentration (<0.2 ppm), thus, the total chlorine analysis was considered a good approximation of the concentration of chloramines in the water. All reagents and the instruments were those described in the standard Hach Method and can be obtained from Hach Company, Loveland, Colo.

Chloramine Removal Test

Chloramine capacity in a flow-through system was evaluated by a flow through test method. A 3 mg/L aqueous chloramine test solution was prepared having: a pH of 7.6±0.25; total dissolved solids of 200-500 mg/L; a hardness less than 170 mg/L as CaCO3; turbidity of less than 1 Nephelometric Turbidity Unit; and a temperature of 20±3° C. The chloramine concentration was controlled at 2.7-3.3 mg/L by the addition of a sodium hypochlorite solution and then addition of an ammonium chloride solution. The pH was controlled by adding sodium hydroxide as needed.

An end-capped carbon block sample (prepared as described below) was then placed into a standard filtration vessel that allowed radial flow from the outside to the inside of the filter media. The vessel was equipped with an inlet and outlet. The aqueous chloramine test solution was run through the filtration system at a flow rate of 0.13 gallons/minute. In this test, the water flow rate was held constant.

The aqueous chloramine test solution described above was flowed through the filtration system for 5 minutes to wet out the carbon block sample. After this, samples of the effluent (outflow from the carbon block sample) were taken periodically and the throughput in gallons was recorded. Effluent samples were analyzed for chloramine using the Chloramine Test described above. The chloramine effluent concentration was then plotted as a function of the aqueous chloramine test solution throughput. The maximum effluent chloramine concentration is 0.5 mg/L.

Particle Reduction Test

The ability of the carbon block to remove particles was tested in a flow-through set-up. Water was spiked with 0-5 micron test dust acquired from Powder Technologies Inc. of Burnsville, Minn. The particulate-containing water was passed through the carbon block at an initial flow rate of 0.57 gallons per minute. The number of particles in the influent and effluent were measured by particle counters supplied by IBR Inc., Grass Lake, Mich.

Mercury Removal Test

The ability to remove undesired metal compounds was evaluated by challenging the carbon block with 6 ppb mercury in a flow-through set-up. Testing was conducted per NSF (National Sanitation Foundation) Standard 53 for reduction of mercury at pH 8.5. The flow rate was 0.5 gallons per minute. The water flow duty cycle was 15 min on/15 min off and 16 hours per day. The tests were conducted in duplicate for two carbon blocks. Capacity for mercury reduction is reported as the volume of water treated before the effluent mercury concentration exceeds the maximum contaminant concentration of 2 ppb.

Combustion Analysis of Hydrogen, Nitrogen and Sulfur

The weight percent carbon, hydrogen, nitrogen and sulfur in a sample was measured by combustion using a LECO TruSpec Micro CHNS elemental analyzer, Laboratory Equipment Co. St. Joseph, Mich. Briefly, the sample is placed in the instrument and purged of atmospheric gases. The sample is then heated to over 1000° C. in the presence of oxygen to combust the sample. The sample is then passed through a second furnace for further oxidation, reduction, and particulate removal. The combustion gases are then passed through various detectors to determine the content of the carbon, hydrogen, nitrogen, and sulfur.

A sulfamethazine standard (>99%, from LECO) was diluted to make a calibration curve ranging from 1 mg to 2.6 mg sulfamethazine. The instrument is baselined with ambient air until the CHNS detectors stabilized. Then, 3-4 empty crucibles were measured and set as instrument blanks. Next, the sulfamethazine standards were analyzed to form a calibration curve. The absolute standard deviation of the sulfamethazine standard (acceptable precision for a pure homogeneous material) for the elements were: <+/−0.3 wt % for hydrogen, <+/−0.3 wt % for nitrogen and <+/−0.3 wt. % for sulfur with a limit of detection of 0.10 wt % for each of the elements.

Surface Analysis of Sample

Chemical states and elemental compositions of a sample were analyzed by X-ray photoelectron spectroscopy, using a Kratos Axis Ultra™ XPS system (Shimadzu Corp., Columbia, Md.) at a base pressure bellow $10^{-9}$ Torr. The monochromatic AlKα (1486.6 eV) X-ray source was operated at 140 Watts (14 KV, 10 mA). Hemispherical electron energy analyzer operated at constant pass energy of 160 eV for survey and 20 eV for high resolution spectra. The binding energy (BE) scale was calibrated relative to the BE of C is peak. The spectra were acquired at 90° take-off angle with respect to the sample surface. The data processing was done with PHI MultiPak V8. 2B, 2006 and Casa XPS Version 2.3.16 Dev41 software. Surface compositions were calculated from measured photoelectron peak areas in survey spectra after correction for appropriate Scofield ionization cross sections. The reported overall atomic concentrations are mean values derived from the survey spectra collected at multiple randomly selected sample regions. The surface content of catalyst functional groups was determined by de-convolution/curve fitting analysis of C 1s, O 1s, N 1s and S 2p core level spectra. The curve fitting analysis was based on summed Gaussian/Lorentzian GL function and Shirley type background subtraction.

Preparing Carbon Blocks Sample 40 cm³ of the selected carbon substrate (80×325 mesh nominal particle size) was added into a blender. The volume of the carbon was determined at the maximum uncompressed density. 40 cm³ of Ticona GUR 2126 ultra high molecular weight polyethylene (UHMWPE) powder (from Ticona Engineering Polymers, Florence Ky.) at its maximum uncompressed density was measured and placed into the blender. The carbon and UHMWPE were blended for 3 minutes. The mixture was then quantitatively transferred to a cylindrical shaped mold with a hollow cylindrical core having the dimensions of 1.35 in. (34.3 mm) outer diameter, 0.375 in. (9.5 mm) inner diameter, and 3.6 in. (91.4 mm) length. The mold was filled using an impulse filling as described in U.S. Pat. No. 8,206,627 (Stouffer et al.) to the maximum uncompressed density. The mold was covered and then heated in a convection oven at 180° C. for 50 minutes. After heating, the mold was immediately compressed with a piston to a fixed block length of 3.1 in. (78.7 mm.) The mold was cooled to room temperature and the resulting carbon block was removed from the mold. End caps were applied to the block using hot melt glue.

Carbon Substrate A

Carbon Substrate A was a wood-based activated carbon (nominal 80×325 mesh, obtained from MeadWestvaco Specialty Chemicals, North Charleston, S.C., under the trade designation "AQUAGUARD 325",) used as received without further treatment. Carbon Substrate A is currently commercially marketed as being specifically designed to control chloramine, chlorine, tastes, and odors in water. It is said to have unparalleled high chloramine capacity and is the catalytic carbon of choice in point of use water filters where chloramine reduction capacity is important. See product brochure "AQUAGUARD 200 and 325: Catalytic Activated Carbon" revised June 2012.

Carbon Substrate B

Carbon Substrate B was a coconut shell activated carbon (nominal 80×325 mesh, obtained from Kuraray Chemical, Osaka, Japan, under the trade designation "PGW-100MP"). It had a nominal 100 micron median particle size.

Carbon Substrate C

Carbon Substrate C was a coconut shell activated carbon (nominal 80×325 mesh, obtained from Kuraray Chemical, Osaka, Japan, under the trade designation "PGW-120MP". It had a nominal 120 micron median particle size.

Carbon Substrate 1

Carbon Substrate B was heated to 180° C. in a crucible and then elemental sulfur (0.2 g sulfur per gram carbon, obtained from Alfa Aesar, Ward Hill, Mass., −325 mesh, 99.5%) was added with stirring. The sulfur melted and was incorporated into the Carbon Substrate B.

A loose fitting lid was placed on the crucible containing the carbon substrate-sulfur mix. The crucible was then placed in a nitrogen purged muffle furnace, equilibrated to 550° C. and held at that temperature for 30 minutes. The crucible was removed from the furnace and transferred to a nitrogen-purged container for cooling to near room temperature. Carbon Substrate 1 was found to have 8.44 wt % sulfur, 0.12 wt % nitrogen, and the hydrogen was below the limit of detection when tested following the "Combustion Analysis of Hydrogen, Nitrogen and Sulfur" procedure above.

Carbon Substrate 2

Carbon Substrate 2 was prepared in the same manner as Carbon Substrate 1. Carbon Substrate 2 was found to have 14.79 wt % sulfur, and the hydrogen and nitrogen content was below the limit of detection (0.10 wt %) when tested following the "Combustion Analysis of Hydrogen, Nitrogen and Sulfur" procedure above.

Carbon Substrate 3

Carbon Substrate 3 was prepared in the same manner as Carbon Substrate 1, except that the Carbon Substrate B was replaced with Carbon Substrate C. Carbon Substrate 3 was found to have 15.43 wt % sulfur, and the hydrogen and nitrogen content was below the limit of detection (0.10 wt %) when tested following the "Combustion Analysis of Hydrogen, Nitrogen and Sulfur" procedure above.

Carbon Substrate 4

Carbon Substrate 4 was prepared as in Carbon Substrate 2 and tested by the "Surface Analysis" method above. Carbon Substrate 4 was found to comprise 91.1 atomic % carbon, 0.6 atomic % nitrogen, 2.1 atomic % oxygen and 5.3 atomic % sulfur. Of the 5.3 atomic percent sulfur on the surface of the sample: 7.4% was in the −2 oxidation state, 65.9% was in the 0 oxidation state, 13.4% was in the +2 oxidation state, 9.5% was in the +4 oxidation state and 3.8% was in the +6 oxidation state.

Carbon Substrate 5

Carbon Substrate 5 was prepared as in Carbon Substrate 3 and tested by the "Surface Analysis" method above. Carbon Substrate 5 was found to comprise 92.1 atomic % carbon, 0.4 atomic % nitrogen, 2.3 atomic % oxygen and 5.1 atomic % sulfur. Of the 5.1 atomic percent sulfur on the surface of the sample: 7.5% was in the −2 oxidation state, 62.2% was in the 0 oxidation state, 14.1% was in the +2 oxidation state, 10.6% was in the +4 oxidation state and 5.6% was in the +6 oxidation state.

Example 1

Carbon Substrate 1 was prepared into a carbon block following the "Preparing Carbon Block Sample" procedure described above.

Comparative Example A

Carbon Substrate A was prepared into a carbon block following the "Preparing Carbon Block Sample" procedure described above.

Example 1 and Comparative Example A were each individually tested following the Chloramine Removal Test. Shown in FIG. 1 is the amount of chloramine detected versus throughput in gallons for Example 1 and Comparative Example A. The capacity of the carbon block sample is reported as the throughput attained before the concentration of chloramines in the effluent rises above 0.5 mg/L. For the carbon block prepared with Carbon Substrate 1 (Example 1), the capacity was about 440 gallons, while the carbon block prepared with Carbon Substrate A (Comparative Example A) carbon block was about 40 gallons.

Example 2

A blender was filled with the following 50 wt % Carbon Substrate 2, 20 wt % Carbon Substrate 3, 7 wt % Ticona GUR 2126 ultra high molecular weight polyethylene (UHMWPE) powder (from Ticona Engineering Polymers, Florence Ky.) and 18 wt % Ticona GUR 4150-3 ultra high molecular weight polyethylene (UHMWPE) powder (from Ticona Engineering Polymers, Florence Ky.). The carbon substrates and UHMWPE were blended for 3 minutes. The mixture was then quantitatively transferred to a cylindrical shaped mold with a hollow cylindrical core having the dimensions of 1.35 in. (34.3 mm) outer diameter, 0.375 in. (9.5 mm) inner diameter, and 3.6 in. (91.4 mm) length. The mold was filled using an impulse filling as described in U.S. Pat. No. 8,206,627 (Stouffer et al.) to the maximum uncompressed density. The mold was covered and then heated in a convection oven at 180° C. for 50 minutes. After heating, the mold was immediately compressed with a piston to a fixed block length of 4.5 in. (11 cm) The mold was cooled to room temperature and the resulting carbon block was removed from the mold. End caps were applied to the block using hot melt glue and the block was placed in a filter housing.

Example 2 was tested following the Particle Reduction Test described above. This testing indicated >99.98% reduction of 2 micron particles.

Comparative Example B

Carbon blocks were made in the same manner as described in Example 2 above, except that Carbon Substrate 2 was replaced with Carbon Substrate B, and Carbon Substrate 3 was replaced with Carbon Substrate C.

Figure 2:
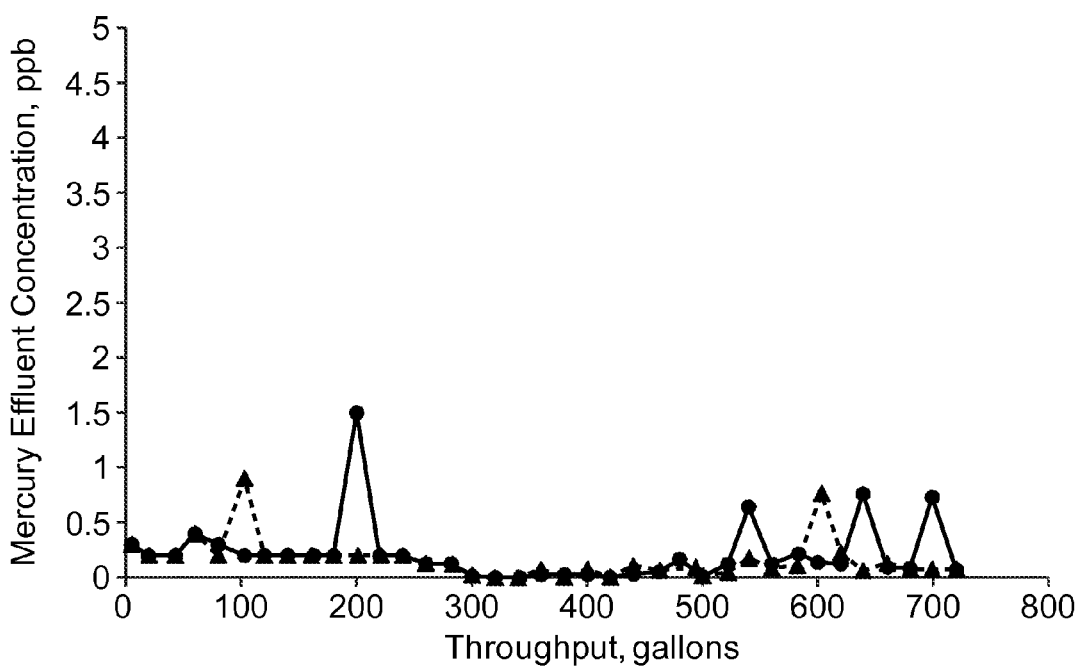
FIG. 2 is a chart of the amount of mercury in the effluent versus gallons treated using Example 2 run in duplicate.
Figure 3:
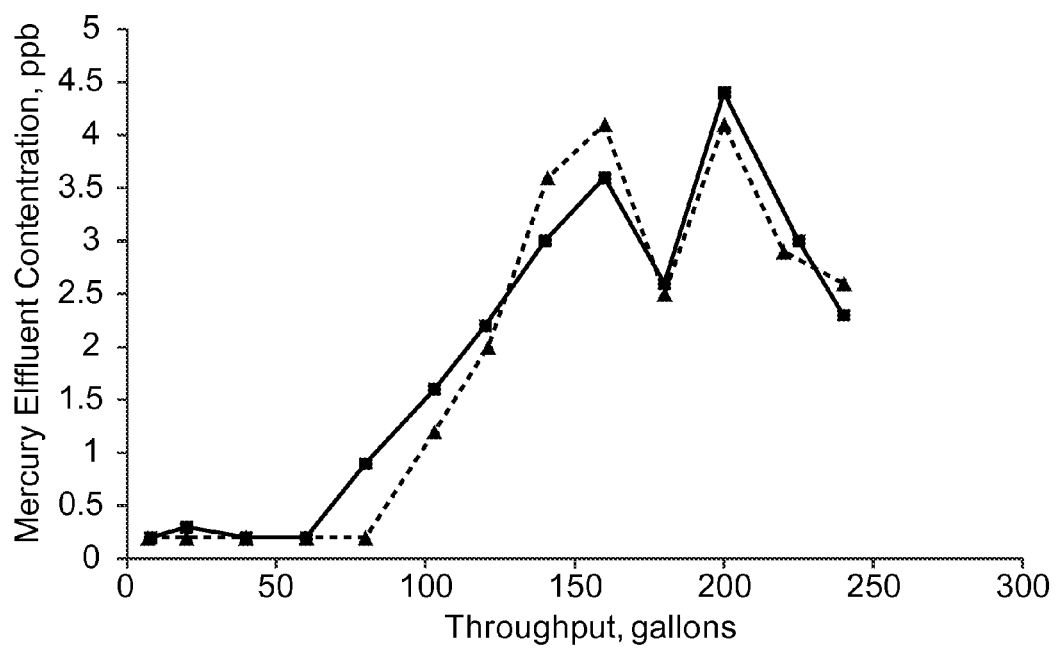
FIG. 3 is a chart of the amount of mercury in the effluent versus gallons treated using Comparative Example B run in duplicate.

Example 2 and Comparative Example B were tested for mercury reduction following the Mercury Removal Test. The results are shown in FIG. 2 (Example 2—run in duplicate) and FIG. 3 (Comparative Example 3—run in duplicate). The capacity for Comparative Example B to remove mercury was 100 gallons, while the capacity for Example 2 exceeded 700 gallons. Note: that the maximum contaminant level for mercury was not exceeded before termination of the test at 700 gallons.

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. A method of removing chloramine and mercury from an aqueous solution, the method comprising:
   providing an aqueous solution comprising chloramine and mercury;
   providing a thermal reaction product of (i) an activated carbon and (ii) a reactant comprising sulfur, wherein the reactant comprising sulfur is selected from elemental sulfur, sulfur oxides, hydrogen sulfide, salts containing oxyanions of sulfur, and combinations thereof, wherein the activated carbon and the reactant are reacted at a temperature sufficient to thermally decompose the reactant and enable reaction with the activated carbon, wherein the thermal reaction product comprises at least 1.5% by mass of sulfur; and
   contacting the aqueous solution with the thermal reaction product, wherein upon said contacting, the thermal reaction product reacts with the chloramine and the mercury in the aqueous solution to reduce the amount of chloramine and mercury in the aqueous solution.

2. The method of claim 1, wherein the surface of the thermal reaction product comprises a species of $CO_xS_y$, wherein x is no more than 0.1, and y is 0.005 to 0.3.

3. The method of claim 1, wherein the thermal reaction product further comprises nitrogen and the sum of the sulfur and nitrogen is at least 4.0% by mass.

4. The method of claim 1, wherein at least 0.2% by mass of the thermal reaction product comprises sulfur in an oxidation state higher than 0 based on XPS surface analysis.

5. The method of claim 1, wherein the activated carbon has a bulk density of greater than 0.6 g/cc.

6. The method of claim 1, wherein the activated carbon has an ash content less than 3%.

7. The method of claim 1, wherein the thermal reaction product is disposed within a matrix, wherein the matrix is a polymer matrix.

8. The method of claim 7, wherein the matrix further comprises particles comprising titanium.

9. The method of claim 7, wherein the polymer matrix comprises polyethylene.

10. The method of claim 7, wherein the matrix consists essentially of the thermal reaction product, a polymer matrix, and optionally titanium.

11. The method of claim 1, wherein the aqueous solution comprises 3ppm of chloramine and amount of chloramine is decreased by at least 70% after contact with the thermal reaction product.

12. The method of claim 1, wherein the aqueous solution comprises 6ppb mercury and amount of mercury is decreased by at least 60% after contact with the thermal reaction product.

13. The method of claim 1, wherein the thermal reaction product has a capacity of at least 0.1 gram/cubic centimeter for removing chloramine.

14. The method of claim 1, wherein the thermal reaction product has a capacity of at least 0.00025 gram/cubic centimeter for removing mercury.

15. The method of claim 1, wherein the reactant comprises nitrogen.

16. The method of claim 1, wherein the thermal reaction product comprises at least 4.0% by mass of sulfur.

* * * * *